(12) United States Patent
Niizuma

(10) Patent No.: US 9,866,071 B2
(45) Date of Patent: Jan. 9, 2018

(54) WIRELESS POWER TRANSMISSION DEVICE FOR CLOSED SPACE

(71) Applicant: IHI Corporation, Tokyo (JP)

(72) Inventor: Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 433 days.

(21) Appl. No.: 14/594,796

(22) Filed: Jan. 12, 2015

(65) Prior Publication Data

US 2015/0123487 A1    May 7, 2015

Related U.S. Application Data

(63) Continuation of application No. PCT/JP2013/068427, filed on Jul. 4, 2013.

(30) Foreign Application Priority Data

Jul. 24, 2012   (JP) ................. 2012-163182

(51) Int. Cl.
*H02J 5/00* (2016.01)
*H02J 50/10* (2016.01)
*H02J 50/12* (2016.01)
*H02J 50/00* (2016.01)
*B25J 19/00* (2006.01)

(52) U.S. Cl.
CPC ........... *H02J 50/10* (2016.02); *B25J 19/0045* (2013.01); *H02J 5/005* (2013.01); *H02J 50/00* (2016.02); *H02J 50/12* (2016.02)

(58) Field of Classification Search
CPC .. H02J 50/00; H02J 50/10; H02J 50/12; B25J 19/005; B25J 21/02; B25J 21/005; B25J 21/0045
See application file for complete search history.

(56) References Cited

U.S. PATENT DOCUMENTS

| | | | |
|---|---|---|---|
| 4,686,328 A | 8/1987 | Ui et al. | |
| 8,729,734 B2* | 5/2014 | Cook ...................... | H01F 38/14 307/104 |
| 8,923,015 B2* | 12/2014 | Madawala .............. | H02J 5/005 307/104 |
| 9,484,751 B2* | 11/2016 | Byrne ..................... | H02J 5/005 |
| 2004/0073027 A1 | 4/2004 | Coufal et al. | |

(Continued)

FOREIGN PATENT DOCUMENTS

| | | |
|---|---|---|
| CN | 201437940 U | 4/2010 |
| JP | S61-079195 A | 4/1986 |

(Continued)

OTHER PUBLICATIONS

International Search Report, PCT/JP2013/068427, dated Aug. 13, 2013, 1 pg. (English Translation), 2 pgs. (Japanese Language), 3 pgs. total.

*Primary Examiner* — Thomas J Hiltunen
(74) *Attorney, Agent, or Firm* — Volpe and Koenig, P.C.

(57) ABSTRACT

A wireless power transmission device includes an inner retainer fixed to an inner surface of a wall and supporting a power-receiving coil in proximity to a power transmission wall, and an outer retainer fixed to an outer surface of the wall and supporting a power-supplying coil in proximity to the power transmission wall, wherein the electric power is wirelessly transmitted between the power-supplying coil and the power-receiving coil.

10 Claims, 4 Drawing Sheets

(56) References Cited

U.S. PATENT DOCUMENTS

| | | | |
|---|---|---|---|
| 2010/0072825 A1* | 3/2010 | Azancot | H02J 5/005 307/104 |
| 2012/0261927 A1* | 10/2012 | Gilpatrick | H01F 38/14 290/40 B |
| 2013/0099587 A1* | 4/2013 | Lou | H01F 38/14 307/104 |
| 2013/0300204 A1* | 11/2013 | Partovi | H01F 38/14 307/104 |
| 2013/0334892 A1* | 12/2013 | Hall | H01F 38/14 307/104 |
| 2014/0230741 A1* | 8/2014 | Allen | A01K 63/006 119/267 |

FOREIGN PATENT DOCUMENTS

| | | |
|---|---|---|
| JP | 02-16085 B2 | 4/1990 |
| JP | 03-165013 A | 7/1991 |
| JP | 2006-136045 A | 5/2006 |
| JP | 2007-229820 A | 9/2007 |
| JP | 2010-273452 A | 12/2010 |
| JP | 2012-060807 A | 3/2012 |
| WO | 02/051527 A2 | 7/2002 |

\* cited by examiner

WIRELESS POWER TRANSMISSION DEVICE FOR CLOSED SPACE

TECHNICAL FIELD

The present invention relates to a wireless power transmission device configured to wirelessly supply electric power into a closed space.

This application is a continuation application based on a PCT Patent Application No. PCT/JP2013/068427, filed Jul. 4, 2013, whose priority is claimed on Japanese Patent Application No. 2012-163182, filed Jul. 24, 2012. The contents of both the PCT application and the Japanese Patent Application are incorporated herein by reference.

BACKGROUND ART

A closed space such as a glove box, a clean room, or the like, requires high sealability to prevent leakage of substances from the inside to the outside (to deal with bacteria, toxic substances, or filth) and prevent intrusion of substances from the outside to the inside (to prevent intrusion of moisture or dust into dry and clean environment).

Meanwhile, there is a need to supply electric power into the closed space to drive a lighting device and a storage device.

In the related art, a power supply means for such a closed space is disclosed in Patent Documents 1 to 4.

In Patent Document 1, an airtight type concentrated gas fitting panel and an airtight feeding terminal are installed in a glove box.

In Patent Document 2, an airtight type feeding device is installed in a through-hole of a glove box wall.

In Patent Document 3, an electric connector is attached to a stop plug mounted on a glove port of a glove box.

In Patent Document 4, electric power is supplied to a photovoltaic cell of an internal module by that light from a lighting mechanism of the outside, which transmits through a sealing wall of a glove box.

DOCUMENT OF RELATED ART

Patent Documents

[Patent Document 1] Japanese Patent Application, First Publication No. S61-79195
[Patent Document 2] Japanese Patent Publication No. H02-16085
[Patent Document 3] Japanese Patent Application, First Publication No. 2007-229820
[Patent Document 4] European Patent Application, First Publication No. 1354671

SUMMARY OF THE ART

Technical Problem

The above-mentioned power supply means of the related art (1) a means for supplying electric power from the outside to the inside via a connecting terminal (an airtight feeding terminal, an airtight type feeding device, or an electric connector), (2) a means for supplying electric power to a photovoltaic cell by light from the outside, or (3) a means for supplying electric power from a battery installed in the inside.

However, (1) when a connecting terminal is used, since the connecting terminal passes through the wall of the closed space, a through-hole should be formed in the wall to install the connecting terminal. Thus, a complicated structure is needed to seal the through-hole to maintain the sealability. In addition, as a member that constitutes the sealed structure deteriorates with age, sealing performance will degrade and leakage of a substance from the inside to the outside or intrusion of a substance from the outside to the inside may occur.

(2) When electric power is supplied by light from the outside, since electric power output from a photovoltaic cell is small, electric power that can be supplied is limited. In addition, since the wall of the closed space should allow transmission of light, the means cannot be applied to a closed space where light needs to be blocked by the wall.

(3) When a battery is used, since capacity of a battery is limited, the battery has to be replaced at a certain time interval. The closed space needs to be temporarily opened when the battery is replaced, and leakage of a substance or intrusion of a substance may occur.

In addition, the inside of the closed space such as a glove box, a clean room, or the like, may be pressurized or depressurized. In this case, the wall of the closed space may be displaced by pressurization or depressurization of the inside, and supply of electrical power may be affected.

The present invention is conceived to solve the above-mentioned problems. That is, the present invention is directed to provide a wireless power transmission device for a closed space that is capable of being applied to a closed space whose inside is pressurized or depressurized., that is capable of continuously supplying electric power into the closed space for a long time without opening the closed space, that is without possibility of degradation of sealing performance of the closed space with age, and that is also capable of being applied to a closed space that requires light blocking property.

Solution to Problem

According to a first aspect of the present invention, a wireless power transmission device for a closed space surrounded by a wall, a part or all of which is a power transmission wall formed of a material through which an electromagnetic field passes, the wireless power transmission device for the closed space including: an inner retainer fixed to an inner surface of the wall and supporting a power-receiving coil in proximity to the power transmission wall; and an outer retainer fixed to an outer surface of the wall and configured to supporting a power-supplying coil in proximity to the power transmission wall, wherein the electric power is wirelessly transmitted between the power-supplying coil and the power-receiving coil.

Effects of the Invention

According to the configuration of the present invention, since the inner retainer and the outer retainer of the wireless power transmission device are fixed to the inner surface and the outer surface of the wall, even when the wall of the closed space is displaced by pressurization or depressurization of the inside, the inner retainer and the outer retainer are displaced following the displacement of the wall.

Accordingly, the power-receiving coil and the power-supplying coil supported by the inner retainer and the outer retainer can keep relative position across the power transmission wall formed of a material through which an electromagnetic field passes, and electric power can be wirelessly transmitted between the power-supplying coil and the power-receiving coil.

In addition, since the power transmission wall formed of a material through which the electromagnetic field passes can be realized as an integral part and there is no need to drill a through-hole or the like in the power transmission wall, electric power can be continuously supplied into the closed space for a long time without opening the closed space, and there is no possibility of degradation of sealing performance of the closed space with age.

Further, since the power transmission wall does not need to be optically transmissive, the power transmission wall made of a material having light blocking property can also be applied to a closed space where light needs to be blocked.

DESCRIPTION OF EMBODIMENTS

Figure 1A:
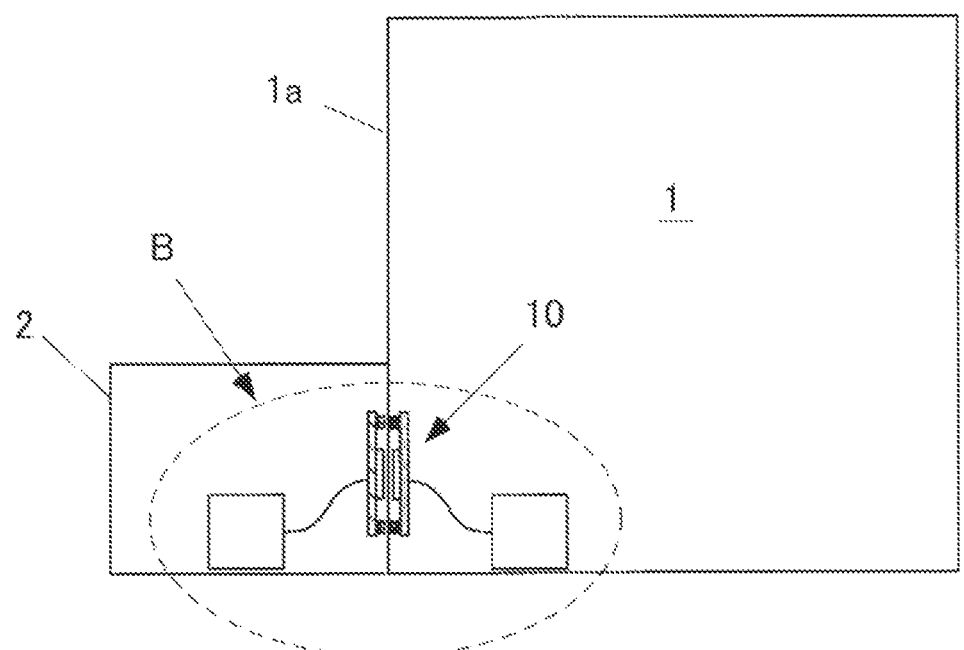
FIG. 1A is a view showing a first embodiment of a wireless power transmission device of the present invention.

Hereinafter, preferred embodiments of the present invention will be described in detail with reference to the accompanying drawings. The same components are designated by the same reference numerals, and redundant descriptions thereof will be omitted.

Figure 1B:
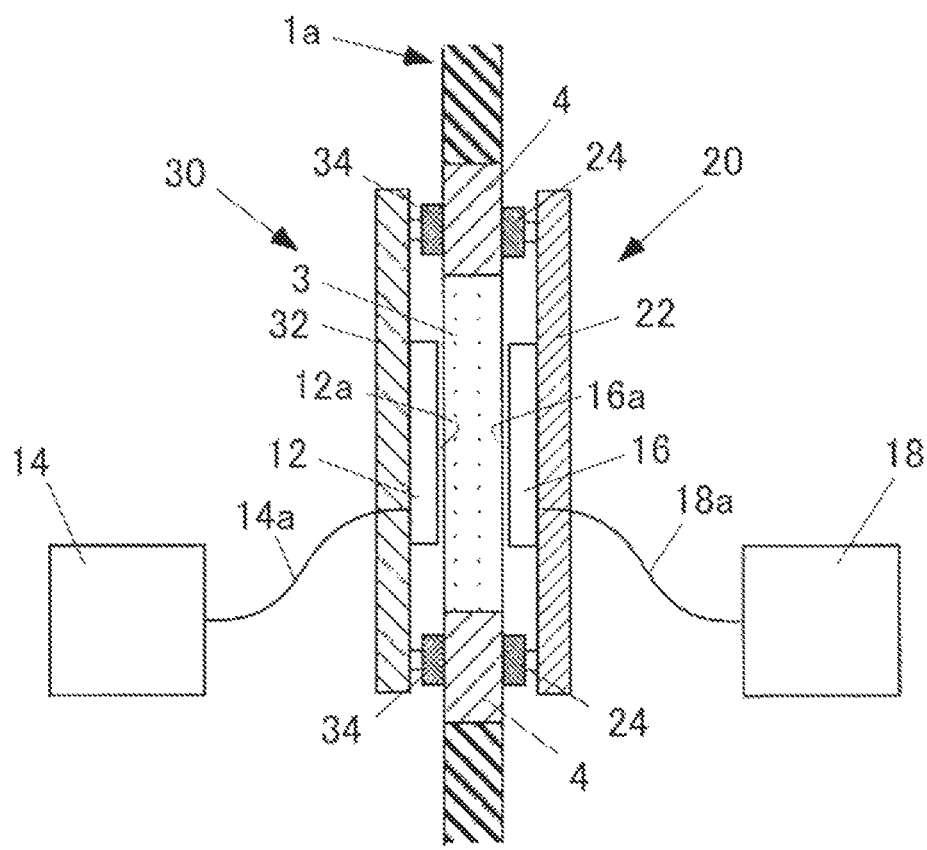
FIG. 1B is a partially enlarged view of FIG. 1A.

FIGS. 1A and 1B are views showing a first embodiment of a wireless power transmission device 10 according to the present invention.

In the drawings, FIG. 1A is a schematic view showing a closed space 1 including the wireless power transmission device 10 according to the present invention, and FIG. 1B is an enlarged view of a part B of FIG. 1A.

In FIG. 1A, the closed space 1 is, for example, a glove box or a clean room, and the inside thereof can be pressurized or depressurized. In addition, an electrical power feeding room 2 is installed next to the closed space 1. The electrical power feeding room 2 is not mandatory and may be omitted.

In FIG. 1B, the closed space 1 is defined by a wall 1a, i.e., the closed space 1 is surrounded by the wall 1a and separated from a peripheral space. In addition, a part or all of the wall 1a is a power transmission wall 3 formed of a material through which an electromagnetic field passes. "The material through which the electromagnetic field passes" is, for example, glass, plastic, fiber-reinforced plastic (FRP), or the like, but other materials may be arbitrarily used according to necessity.

It is preferred that the power transmission wall 3 is formed of rigid plastic or engineering plastic having rigidity and sufficient thickness to reduce deformation caused by pressurization or depressurization of the closed space 1.

The power transmission wall 3 may be either a part or all of the wall 1a that defines the closed space 1. When the power transmission wall 3 is a part of the wall 1a, a retainer fixing section 4 is provided surrounding the power transmission wall 3.

The retainer fixing section 4 may be formed of the same material as the power transmission wall 3 or of the same material as a part of the wall 1a other than the power transmission wall 3.

The power transmission wall 3 includes a region where an electromagnetic circuit is formed between a power-supplying coil 12 and a power-receiving coil 16. That is, the power transmission wall 3 has such a size and a shape that the power transmission wall 3 includes a region where an electromagnetic field is formed upon wireless supply of electric power. Since the power transmission wall 3 is formed of the material through which the electromagnetic field passes and the power transmission wall 3 has the above-mentioned size and shape, electric power can be wirelessly supplied from the power-supplying coil 12 to the power-receiving coil 16 across the power transmission wall 3 without decreasing efficiency.

The wireless power transmission device 10 of the present invention is provided for the closed space 1 and has a function of supplying electric power into the closed space 1.

In FIG. 1B, the wireless power transmission device 10 includes the power-supplying coil 12 disposed outside the closed space 1, a power-supplying circuit 14 configured to supply electric power to the power-supplying coil 12, the power-receiving coil 16 disposed inside the closed space 1, and a power-receiving circuit 18 configured to receive the electric power from the power-receiving coil 16, and the electric power is wirelessly transmitted between the power-supplying coil 12 and the power-receiving coil 16.

The power-supplying coil 12 and the power-supplying circuit 14 are electrically connected via power cable 14a, and the power-receiving coil 16 and the power-receiving circuit 18 are electrically connected via power cable 18a.

Both of the power-supplying coil 12 and the power-receiving coil 16 are preferably rectangular coils when seen in a direction perpendicular to the power transmission wall 3 (a shape when seen from the right as in FIG. 1B).

The shapes of the power-supplying coil 12 and the power-receiving coil 16 may be arbitrarily selected, for example, circular shapes or oval shapes, as long as wireless power transmission is possible. In addition, the shapes of the power-supplying coil 12 and the power-receiving coil 16 may be different from each other.

An electromagnetic circuit is formed as the power-supplying coil 12 and the power-receiving coil 16 are disposed in proximity and opposing each other. The electromagnetic circuit is a circuit in which the power-supplying coil 12 and the power-receiving coil 16 are electromagnetically coupled to wirelessly supply electric power from the power-supplying coil 12 to the power-receiving coil 16, and may be one of a circuit configured to supply electric power in "an electromagnetic induction type" and a circuit configured to supply electric power in "a magnetic field resonance type."

Distance between a power-supplying surface 12a of the power-supplying coil 12 and a power-receiving surface 16a of the power-receiving coil 16 can be arbitrarily selected as long as the electromagnetic circuit is formed therebetween and desired wireless power transmission is possible.

The wireless power transmission device 10 of the present invention further includes an inner retainer 20 and an outer retainer 30.

The inner retainer 20 is fixed to the inner surface of the wall 1a, and supports the power-receiving coil 16 in proximity to the power transmission wall 3.

In FIG. 1B, the inner retainer 20 has an inner coil supporting member 22 and an inner surface fixing member 24.

The inner coil supporting member 22 is a member supporting the power-receiving coil 16, and in this example, a flat member.

The inner surface fixing member 24 is fixed along a fringe of the inner coil supporting member 22, and fixes the inner coil supporting member 22 to the inner surface of the wall 1a.

A gap is formed between the power-receiving surface 16a of the power-receiving coil 16 and the inner surface of the power transmission wall 3, so that the power transmission wall 3 does not come in contact with the power-receiving surface 16a even when the power transmission wall 3 is deformed by pressurization or depressurization of the closed space 1.

According to the above-mentioned configuration, an influence of pressurization or depressurization of the closed space 1 on wireless power transmission can be avoided.

The inner coil supporting member 22 and the inner surface fixing member 24 are preferably formed of a material capable of withstanding an environment (for example, a temperature, a pressure) in the closed space 1 and substances (for example, contaminants, bacteria, medicine, toxic substances) treated in the closed space 1. In addition, the members may be coated with a resin (for example, Teflon (registered trademark)) capable of withstanding these environment and substances according to necessity.

The outer retainer 30 is fixed to the outer surface of the wall 1a, and supports the power-supplying coil 12 in proximity to the power transmission wall 3.

In FIG. 1B, the outer retainer 30 has an outer coil supporting member 32 and an outer surface fixing member 34.

The outer coil supporting member 32 is a member supporting the power-supplying coil 12, and in this example, a flat member.

The outer surface fixing member 34 is fixed along a fringe of the outer coil supporting member 32, and fixes the outer coil supporting member 32 to the outer surface of the wall 1a.

A gap is formed between the power-supplying surface 12a of the power-supplying coil 12 and the outer surface of the power transmission wall 3, so that the power transmission wall 3 does not come in contact with the power-supplying surface 12a even when the power transmission wall 3 is deformed by pressurization or depressurization of the closed space 1.

According to the above-mentioned configuration, an influence of pressurization or depressurization of the closed space 1 on wireless power transmission can be avoided.

Figure 2A:
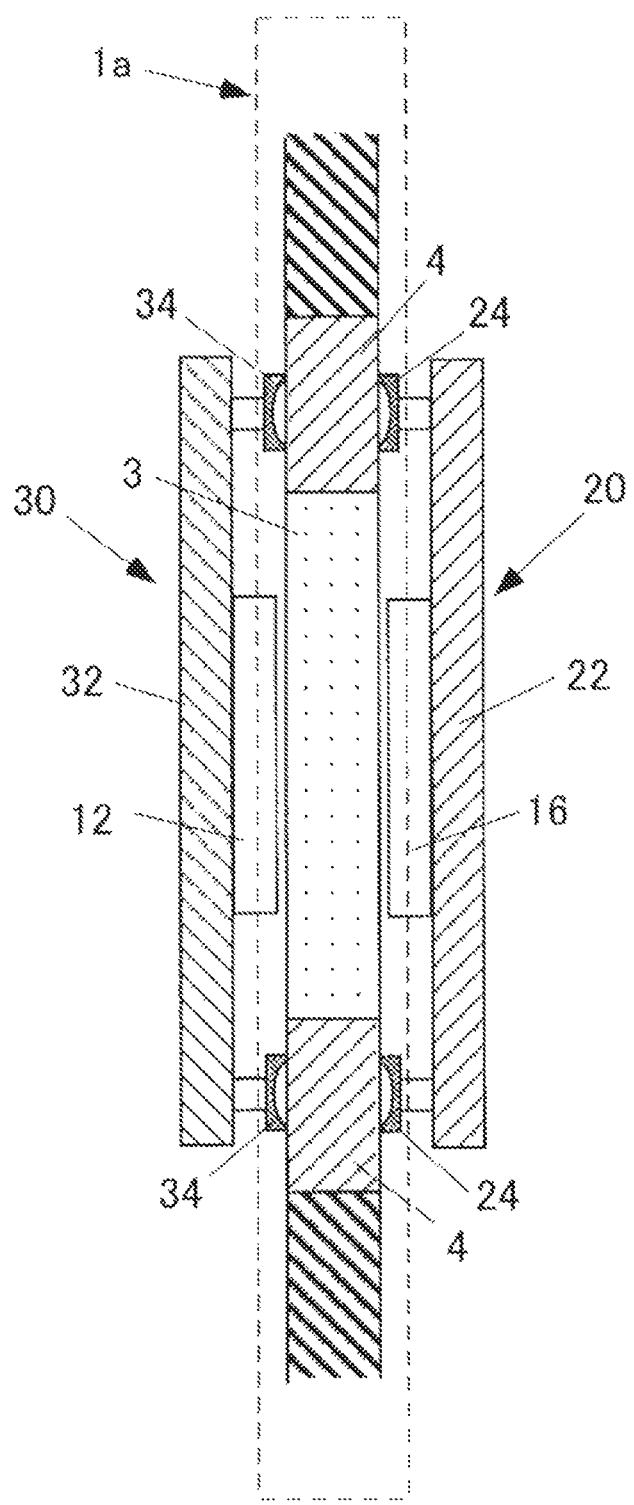
FIG. 2A is a view showing a specific example of an inner retainer and an outer retainer of the wireless power transmission device of the present invention.
Figure 2B:
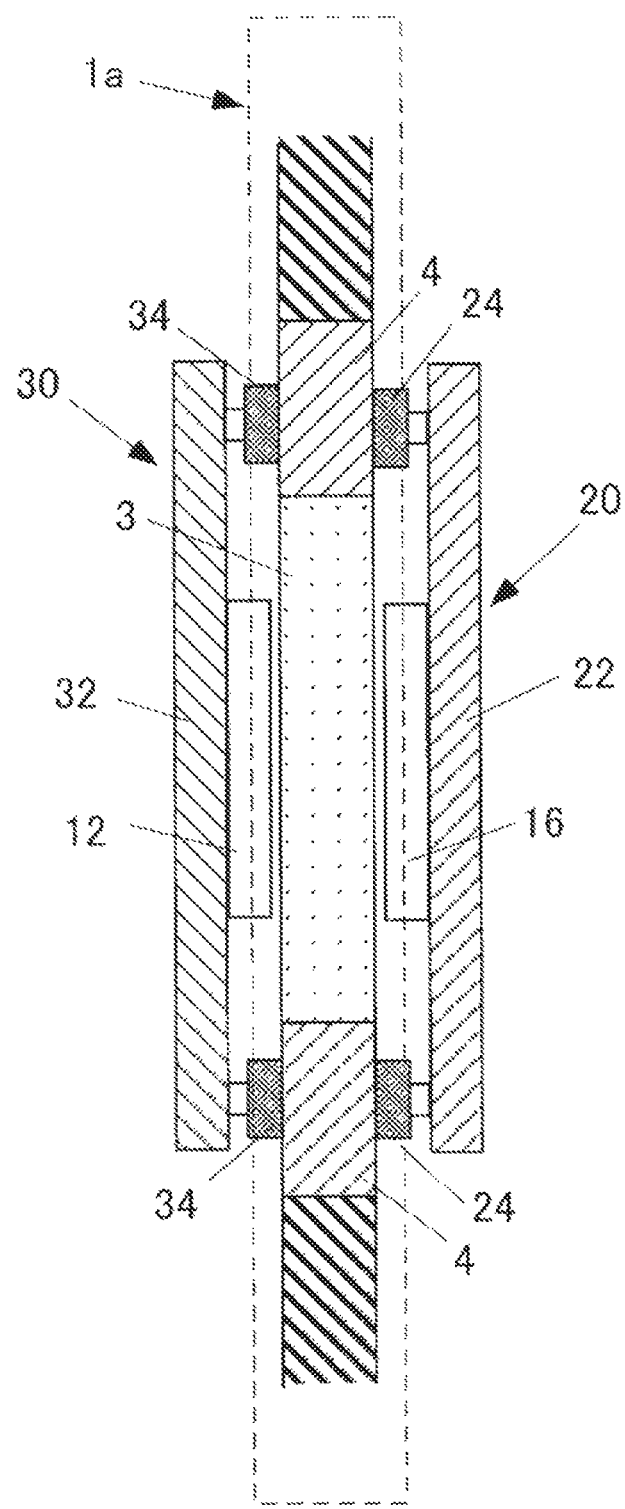
FIG. 2B is a view showing a specific example of an inner retainer and an outer retainer of the wireless power transmission device of the present invention.

FIGS. 2A and 2B are views showing specific examples of the inner retainer 20 and the outer retainer 30.

In FIG. 2A, the inner surface fixing member 24 and the outer surface fixing member 34 are vacuum cups that can adhere respectively to the inner surface and to the outer surface of the retainer fixing section 4, and can be fixed to arbitrary positions of the retainer fixing section 4.

It is preferred that plurality of vacuum cups are provided. The vacuum cup of the inner retainer 20 is configured to have such a suction force that, even if the closed space 1 is pressurized or depressurized, the inner retainer 20 is not detached from the retainer fixing section 4 or move along the inner surface even when a force is applied by weight of the inner retainer 20, by weight of the power-receiving coil 16, by weight and oscillations of a power cable 18a, or the like. The vacuum cup of the outer retainer 30 is configured to have such suction power that, under pneumatic pressure outside the wall 1a, the outer retainer 30 is not detached from the retainer fixing section 4 or move along the outer surface even when a force is applied by weight of the outer retainer 30, by weight of the power-supplying coil 12, by weight and oscillations of the power cable 14a, or the like.

When the vacuum cup is used, surface of the retainer fixing section 4 must be smooth, so that air should not leak from gap when the vacuum cup is suctioned.

In addition, the vacuum cups are preferably connected to the inner coil supporting member 22 and to the outer coil supporting member 32 with flexibility or elasticity, so that they can follow displacement of the wall 1a.

FIG. 2B is a view showing another specific example of the inner retainer 20 and the outer retainer 30. In FIG. 2B, the inner surface fixing member 24 and the outer surface fixing member 34 are magnets that are able to adhere respectively to the inner surface and to the outer surface of the retainer fixing section 4, and can be attached and fixed to arbitrary positions of the retainer fixing section 4.

It is preferred that plurality of magnets are provided. The magnet of the inner retainer has a magnetic force that generates such an attractive force that the inner retainer 20 is not detached from the retainer fixing section 4 or move along the inner surface even when a force is applied by weight of the inner retainer 20, by weight of the power-receiving coil 16, by weight and oscillations of the power cable 18a, or the like. The magnet of the outer retainer has a magnetic force that generates such an attractive force such that the outer retainer 30 is not detached from the retainer fixing section 4 or move along the outer surface even when a force is applied by weight of the outer retainer 30, by weight of the power-supplying coil 12, by weight and oscillations of the power cable 14a, or the like.

The magnet may be a permanent magnet or an electromagnet. When the magnet is a permanent magnet, it is preferred that a switching means for switching attraction and separation thereof are provided. When the magnet is an electromagnet, it is preferred that the electromagnet of the inside and of the outside are supplied with electric power respectively from the power-receiving circuit 18 and from the power-supplying circuit 14 and that switches are provided for each of the electromagnets to turn on and off the electromagnets.

The retainer fixing section 4 must be of a material to which the magnet is attracted (for example, a magnetic body such as iron or the like) and preferably has a smooth surface. In this case, it is possible that only one of the inner surface fixing member 24 and the outer surface fixing member 34 is a magnet.

As still another example of the inner retainer 20 and the outer retainer 30, in FIG. 2B, each of the inner surface fixing member 24 and the outer surface fixing member 34 is a magnet, and the inner surface fixing member 24 and the outer surface fixing member 34 are disposed to match (oppose) each other so that they are pulled together to sandwich the wall 1a. The inner surface fixing member 24 and the outer surface fixing member 34 are fixed to the wall 1a by mutual attraction of the magnets through the wall 1a.

The magnet of the inner retainer and the magnet of the outer retainer have a magnetic force that can generate an attractive force to sandwich the wall 1a with such a force that the inner retainer 20 is not detached from the retainer fixing section 4 or move along the inner surface even when a force is applied by weight of the inner retainer 20, by weight of the power-receiving coil 16, by weight and oscillations of the power cable 18a, or the like, and the outer retainer 30 is not detached from the retainer fixing section 4 or move along the outer surface even when a force is applied by weight of the outer retainer 30, by weight of the power-supplying coil 12, by weight and oscillations of the power cable 14a, or the like.

The retainer fixing section 4 must be formed of a material through which a magnetic force passes (for example, glass, plastic, FRP, or the like), and have a smooth surface with a large coefficient of friction.

In all of the specific examples in which the magnet is used, the magnet has an advantage, for example, in that the magnet can generate attractive force even when the closed space 1 is vacuumed.

In addition, the magnets are preferably connected to the inner coil supporting member 22 and to the outer coil supporting member 32 with flexibility or elasticity, so that they can follow displacement of the wall 1a.

Combination of the inner surface fixing member 24 and the outer surface fixing member 34 may be any one of the following and may be arbitrarily selected from; (1) both of the members are the vacuum cups, (2) one is the vacuum cup and the other is the magnet that adheres to the wall 1a, (3) both of the members are the magnets that adhere to the wall 1a, or (4) both of the members are the magnets to sandwich the wall 1a therebetween.

In addition, the vacuum cup and the magnet may be used together for the inner surface fixing member 24 and the outer surface fixing member 34.

As the vacuum cup or the magnet are used as the inner surface fixing member 24 and the outer surface fixing member 34, it is unnecessary to hammer or screw a fixing nail or a fixing screw into the wall 1a, and strength of the wall 1a is not decreased. In addition, unlike fixation with an adhesive agent, as the vacuum cup and the magnet can be removed from the wall 1a when wireless supply of electric power is unnecessary, the power-receiving coil 16 including the inner retainer 20 and the power-supplying coil 12 including the outer retainer 30 can be transported to other locations.

According to the above-mentioned configuration of the first embodiment, since the inner retainer 20 and the outer retainer 30 are fixed to the inner surface and the outer surface of the wall 1a, respectively, even when the wall 1a of the closed space 1 is displaced by pressurization or depressurization of the inside, the inner retainer 20 and the outer retainer 30 are displaced following displacement of the wall 1a.

Accordingly, the power-receiving coil 16 and the power-supplying coil 12 respectively supported by the inner retainer 20 and the outer retainer 30 can keep relative position across the power transmission wall 3 formed of the material through which the electromagnetic field passes, and electric power can be wirelessly transmitted between the power-supplying coil 12 and the power-receiving coil 16.

In addition, the power transmission wall 3 formed of the material through which the electromagnetic field passes can be realized as an integral part, and machining of the through-hole or the like is not needed. For this reason, electric power can be continuously supplied into the closed space 1 for a long time without opening the closed space 1, and there is no possibility of degradation of sealing performance of the closed space 1 with age.

Further, since the power transmission wall 3 does not need to be optically transmissive, the power transmission wall 3 made of a material having light blocking property can also be applied to a closed space 1 where light needs to be blocked.

Figure 3:
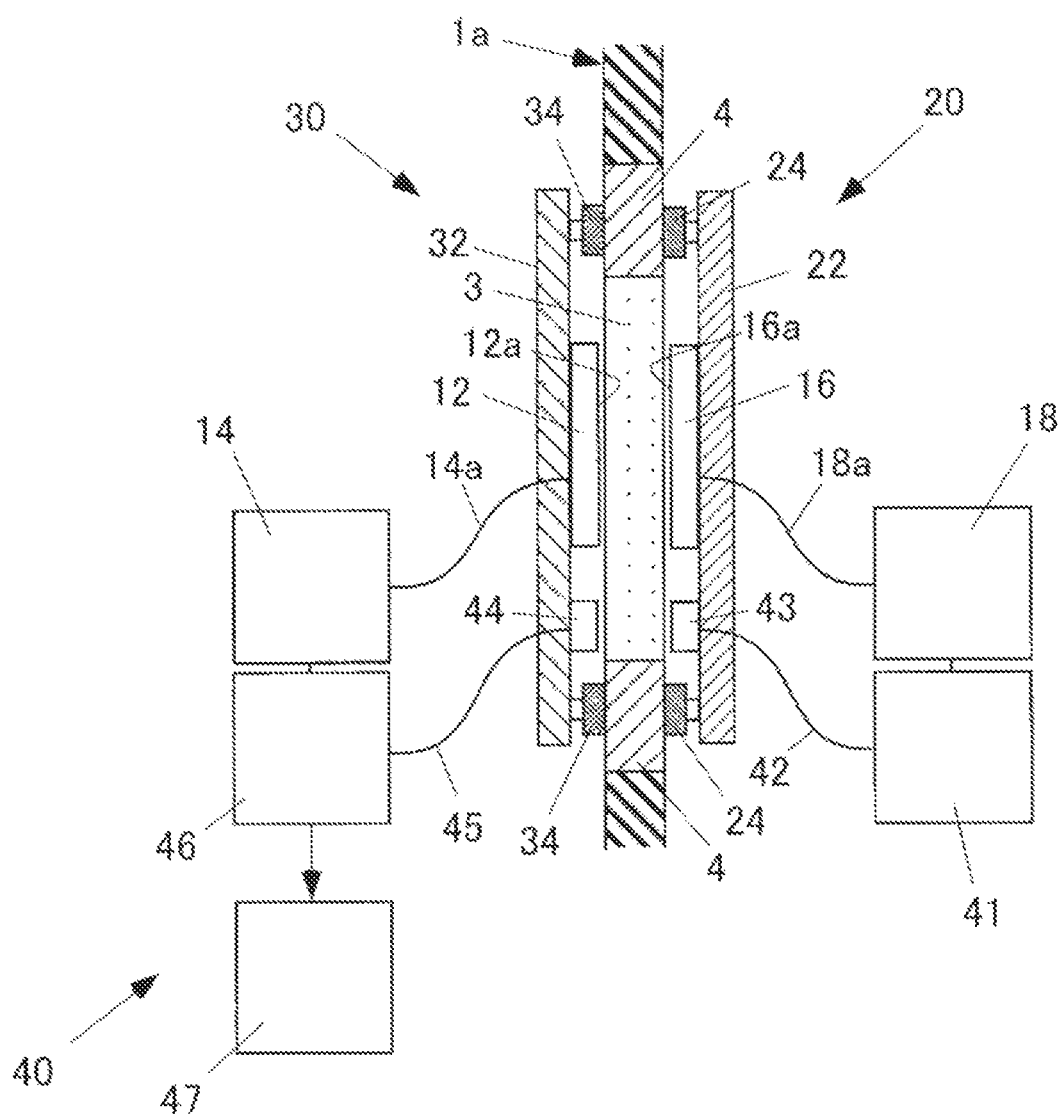
FIG. 3 is a view showing a second embodiment of the wireless power transmission device of the present invention.

FIG. 3 is a view showing a second embodiment of the wireless power transmission device 10 according to the present invention.

In this example, the wireless power transmission device 10 of the present invention is further provided with a transmission efficiency detecting device 40 configured to detect transmission efficiency of electric power transmitted from the power-supplying circuit 14 to the power-receiving circuit 18.

In this example, the transmission efficiency detecting device 40 has a power-receiving calculator 41, a power-receiving signal line 42, a power-receiving transmitter 43, a power-supplying receiver 44, a power-supplying signal line 45, a power-supplying calculator 46 and an output device 47.

The power-receiving calculator 41 calculates amount of received electric energy of the power-receiving circuit 18. The amount of received electric energy can be obtained as a product of voltage and electric current of the power-receiving circuit 18. The obtained data of the amount of received electric energy is input into the power-receiving transmitter 43 via the power-receiving signal line 42.

The power-receiving transmitter 43 and the power-supplying receiver 44 are fixed to opposite positions of the inner coil supporting member 22 and the outer coil supporting member 32, respectively, and communicate the amount of received electric energy of the power-receiving circuit 18 across the power transmission wall 3 from the power-receiving transmitter 43 to the power-supplying receiver 44. The received data of the amount of received electric energy is input into the power-supplying calculator 46 via the power-supplying signal line 45. As a method of communication, for example, wireless communication using a high frequency that does not interfere with the wireless supply of electric power can be used.

The power-supplying calculator 46 calculates amount of feeding electric energy of the power-supplying circuit 14. The amount of feeding electric energy can be obtained as a product of voltage and electric current of the power-supplying circuit 14.

The power-supplying calculator 46 calculates transmission efficiency of electric power transmitted from the amount of received electric energy and the amount of feeding electric energy. The transmission efficiency can be obtained as the transmission efficiency=(the amount of received electric enemy of the power-receiving circuit 18)/(the amount of feeding electric energy of the power-supplying circuit 14).

The output device 47 displays a value of the transmission efficiency as a number or a meter, or outputs an alarm (for example, a lamp or sound) when the transmission efficiency is lower than a preset threshold.

Other configurations are the same as those of the first embodiment.

According to the above-mentioned configuration of the second embodiment, like the first embodiment, the power-receiving coil 16 and the power-supplying coil 12 respectively supported by the inner retainer 20 and the outer retainer 30 can keep relative position across the power transmission wall 3 formed of the material through which the electromagnetic field passes, and electric power can be wirelessly transmitted between the power-supplying coil 12 and the power-receiving coil 16.

In addition, like the first embodiment, in the second embodiment, electric power can be supplied into the closed space 1 for a long time without opening the closed space 1, and there is no possibility of degradation of sealing performance of the closed space 1 with age.

Further, like the first embodiment, in the second embodiment, since the power transmission wall 3 does not need to be optically transmissive, the power transmission wall 3 made of a material having light blocking property can also be applied to a closed space 1 where light needs to be blocked.

Further, according to the above-mentioned configuration of the second embodiment, transmission efficiency of electric power transmitted from the power-supplying circuit 14 to the power-receiving circuit 18 is detected by the transmission efficiency detecting device 40, and the value of the transmission efficiency is displayed on the output device 47 or abnormality thereof is output from the output device 47. For this reason, even when a position of the power-supplying coil 12 or the power-receiving coil 16 is moved by a shock or by interference and they no longer oppose each other, it can be determined that the coils are not opposite to each other by continuously observing the transmission efficiency of the power from the outside and by detecting if the transmission efficiency is decreased.

In addition, even when the power transmission wall 3 is formed of an opaque material having light blocking property, the power-supplying coil 12 and the outer retainer 30 can be installed at a position having high transmission efficiency by viewing the transmission efficiency displayed on the output device 47 outside the wall 1a with eyes, and the positioning thereof can be easily performed.

As the power-supplying coil 12 is disposed at a cleaner side with lower humidity, it is preferred that protection of the coil is simplified so that heat dissipation from the coil becomes easier.

In addition, the power-receiving coil 16 disposed at a contaminated side at which bacteria, toxic substances, and so on, are present is preferably sealed with resin to prevent deterioration of the electric circuit and to make removing of filth easier.

In a particularly contaminated environment or in an environment in which leakage of attachments is not preferable, the power-receiving coil 16 for wireless supply of electric power, the power-receiving circuit 18, the inner coil supporting member 22, the inner surface fixing member 24, and an apparatus using power (for example, an illumination lamp or the like) may be integrally built as a one package so that their discarding after use is made easy.

In addition, when a precision measurement instrument or the like that is susceptible to electromagnetic field is used, an electromagnetic shield may be installed to surround the power-receiving coil 16 (except for the power-receiving surface 16a) and the power-supplying coil 12 (except for the power-supplying surface 12a) using a metal or the like to prevent the electromagnetic field generated with wireless supply of electric power from influencing on the precision measurement instrument or the like.

The present invention is not limited to the above-mentioned embodiments, but is intended to include description of the following claims, and all equivalents and modifications within the spirit and scope of the claims.

INDUSTRIAL APPLICABILITY

The present invention provides a wireless power transmission device for a closed space that is capable of being applied to a closed space whose inside is pressurized or depressurized, that is capable of continuously supplying electric power into the closed space for a long time without opening the closed space, that is without possibility of degradation of sealing performance of the closed space with age and that is also capable of being applied to a closed space that requires light blocking property.

DESCRIPTION OF REFERENCE SIGNS 1 closed space
1a wall
2 electrical power feeding room
3 power transmission wall
4 retainer fixing section
10 wireless power transmission device
12 power-supplying coil
12a power-supplying surface
14 power-supplying circuit
14a power cable
16 power-receiving coil
16a power-receiving surface
18 power-receiving circuit
18a power cable
20 inner retainer
22 inner coil supporting member
24 inner surface fixing member
30 outer retainer
32 outer coil supporting member
34 outer surface fixing member
40 transmission efficiency detecting device
41 power-receiving calculator
42 power-receiving signal line
43 power-receiving transmitter
44 power-supplying receiver
45 power-supplying signal line
46 power-supplying calculator
47 output device

The invention claimed is:

1. A wireless power transmission device for a closed space configured to supply electric power into the closed space surrounded by a wall, a part or all of which is a power transmission wall formed of a material through which an electromagnetic field passes, the wireless power transmission device for the closed space comprising:
   an inner retainer fixed to an inner surface of the wall and supporting a power-receiving coil in proximity to the power transmission wall; and
   an outer retainer fixed to an outer surface of the wall and supporting a power-supplying coil in proximity to the power transmission wall, wherein
   the inner retainer comprises: an inner coil supporting member; an inner surface fixing member; and a flexible or elastic first connecting portion which connects the inner coil supporting member with the inner surface fixing member,
   the outer retainer comprises: an outer coil supporting member; an outer surface fixing member; and a flexible or elastic second connecting portion which connects the outer coil supporting member with the outer surface fixing member, and
   the electric power is wirelessly transmitted between the power-supplying coil and the power-receiving coil.

2. The wireless power transmission device for the closed space according to claim 1, wherein
   gaps are formed between a power-receiving surface of the power-receiving coil and the inner surface of the power transmission wall and between a power-supplying surface of the power-supplying coil and the outer surface of the power transmission wall, and the power transmission wall deformed by pressurization or depressurization of the closed space does not come in contact with the power-receiving surface and the power-supplying surface.

3. The wireless power transmission device for the closed space according to claim 1, wherein one or both of the inner surface fixing member and the outer surface fixing member is a magnet and is fixed to the wall by attraction of the magnet.

4. The wireless power transmission device for the closed space according to claim 2, wherein one or both of the inner surface fixing member and the outer surface fixing member is a magnet and is fixed to the wall by attraction of the magnet.

5. The wireless power transmission device for the closed space according to claim 1, wherein one or both of the inner surface fixing member and the outer surface fixing member is a vacuum cup and is fixed to the wall by suction of the vacuum.

6. The wireless power transmission device for the closed space according to claim 2, wherein one or both of the inner surface fixing member and the outer surface fixing member is a vacuum cup and is fixed to the wall by suction of the vacuum.

7. The wireless power transmission device for the closed space according to claim 1, wherein each of the inner surface fixing member and the outer surface fixing member is a magnet, and the inner surface fixing member and the outer surface fixing member are fixed to the wall by mutual attraction of the magnets through the wall.

8. The wireless power transmission device for the closed space according to claim 2, wherein each of the inner surface fixing member and the outer surface fixing member is a magnet, and the inner surface fixing member and the outer surface member are fixed to the wall by mutual attraction of the magnets through the wall.

9. The wireless power transmission device for the closed space according to claim 1, further comprising:
   a power-supplying circuit installed outside the closed space and configured to supply the electric power to the power-supplying coil;
   a power-receiving circuit installed inside the closed space configured to receive the electric power from the power-receiving coil; and
   a transmission efficiency detecting device configured to detect transmission efficiency of the electric power transmitted from the power-supplying circuit to the power-receiving circuit.

10. The wireless power transmission device for the closed space according to claim 9, wherein the transmission efficiency detecting device has:
   a power-receiving calculator configured to calculate amount of received electric energy of the power-receiving circuit;
   a power-receiving transmitter configured to transmit the amount of received electric energy;
   a power-supplying receiver configured to receive the amount of received electric energy; and
   a power-supplying calculator configured to calculate amount of feeding electric energy of the power-supplying circuit and calculate the transmission efficiency of the transmitted electric power.

* * * * *